July 21, 1964  C. L. NIGH  3,141,707
AUTOMATIC RETARDER CONTROL
Filed May 23, 1963

INVENTOR.
Carl L. Nigh
BY
W. F. Wagner
ATTORNEY

United States Patent Office 3,141,707
Patented July 21, 1964

3,141,707
AUTOMATIC RETARDER CONTROL
Carl L. Nigh, Brownsburg, Ind., assignor to General Motors Corporation, Detroit, Mich., a corporation of Delaware
Filed May 23, 1963, Ser. No. 282,620
5 Claims. (Cl. 303—24)

This invention pertains to a control system for automatically retarding forward movement of a vehicle when the latter obtains a predetermined speed at a predetermined inclination.

When earth-moving vehicles such as rear-dump trucks and scrapers are used in mountainous terrain, they frequently are called upon to descend long, steep downhill grades. As should be apparent, unless some form of braking is applied to the vehicle as it travels down such grades, the vehicle speed may increase beyond a safe point and could result in the driver losing control of the vehicle. In order to prevent this occurrence, the alert driver will maintain a safe descending speed by frequent application of the wheel brakes or by activating the hydraulic brake which is provided with some automatic transmissions. However, inasmuch as a higher speed can be safely maintained at a slight grade as opposed to a steep grade, it is difficult for most drivers to judge whether the vehicle is traveling at an excessive speed for the particular incline.

Accordingly, an important object of this invention is to provide a control system which will automatically brake the vehicle in the event the latter is being operated at an excessive speed for the particular downhill grade. Stated broadly, this object and others are accomplished with a control circuit which is associated with the vehicle braking system and includes a speed-responsive and inclination-responsive means. In addition, means are provided for interconnecting the circuit with the braking system so that the latter is automatically activated when the vehicle attains a predetermined forward speed at a predetermined inclination. Thus, the vehicle operator may freely drive the vehicle without attempting to determine whether the vehicle has attained the dangerous inclination and speed, and his primary attention may be devoted to earth-moving operations without concern for his safety or that of others.

Other features and advantages will become apparent from the following description taken in conjunction with the drawings, in which.

Figure 1:
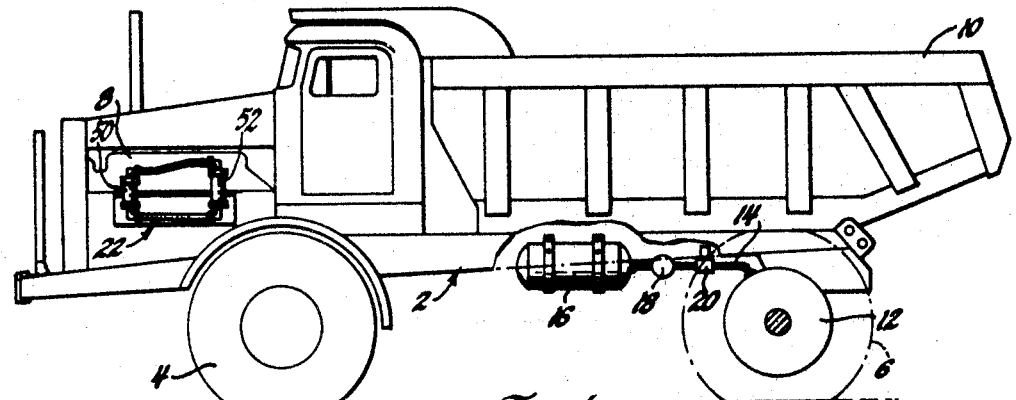
FIGURE 1 is an elevation view of a rear-dump vehicle incorporating the present invention.

Referring to FIGURE 1 of the drawings, the left side of a rear-dump vehicle is shown which comprises the usual frame section 2 that rotatably supports steerable wheels 4 at the forward portion thereof and drive wheels 6 at the rear portion of the frame. As is conventional, the forward portion of the frame section supports an operator's cab and an engine 8, the latter of which is connected through appropriate gearing, not shown, to the drive wheels. In addition, the frame section mounts the usual load retaining body 10 which may be tilted rearwardly and upwardly in the conventional manner for discharging a load. The present invention is incorporated with this vehicle for illustrative purposes and it should be understood that the invention can be employed with other vehicles, as will be apparent as the description proceeds.

An air-operated brake chamber 12 is operatively associated with the drive wheels 6 and is connected through a conduit 14 to a reservoir 16 which stores compressed air generated by the usual engine driven compressor, not shown. A pressure reducing valve 18 and a solenoid operated valve 20 are provided in the conduit 14 with the latter serving to control air supply from the reservoir 16 to the brake chamber 12 in a manner which will hereinafter be described.

Figure 2:
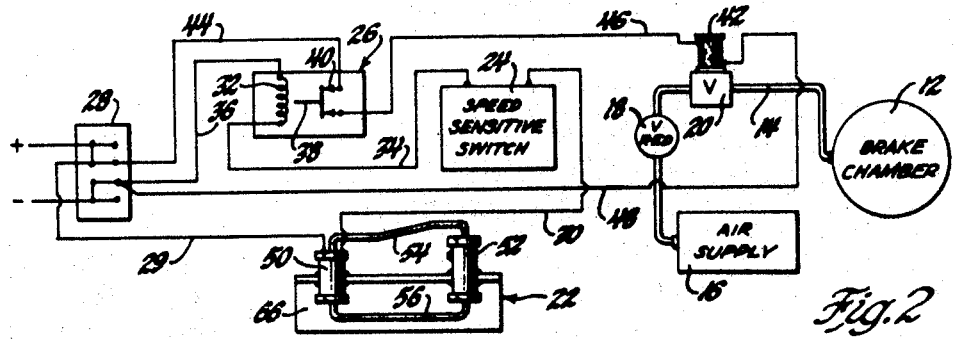
FIGURE 2 is a schematic illustrating the control circuit combined with the brake system of the vehicle of FIGURE 1.

As best seen in FIGURE 2, the air brake system of the vehicle is combined with an electrically operated control circuit which includes a tilt-responsive switch 22, a speed-responsive switch 24, a relay 26, and terminal box 28 which is connected to a source of electrical power such as the vehicle battery. Both the tilt-responsive and speed-responsive switches are connected in series by a line 30 and to the coil 32 of the relay 26 by line 34 while the opposite end of the coil is connected by line 36 to the terminal box. The relay includes the usual armature 38 which is movable upon energization of the coil so as to close the contacts of a switch 40 so as to electrically connect a solenoid 42 with the power source through the lines 44, 46 and 48.

The speed-responsive switch incorporated with the circuit may be of any conventional type readily available on the market which serves to either open or close contacts when the vehicle attains a predetermined speed. A switch of this type can be connected with the speedometer so that upon a certain speed of the vehicle the switch contacts are closed and, in addition, can be adjustable so that contact closing occurs at any speed beyond which it would be considered dangerous to drive the vehicle.

Figure 3:
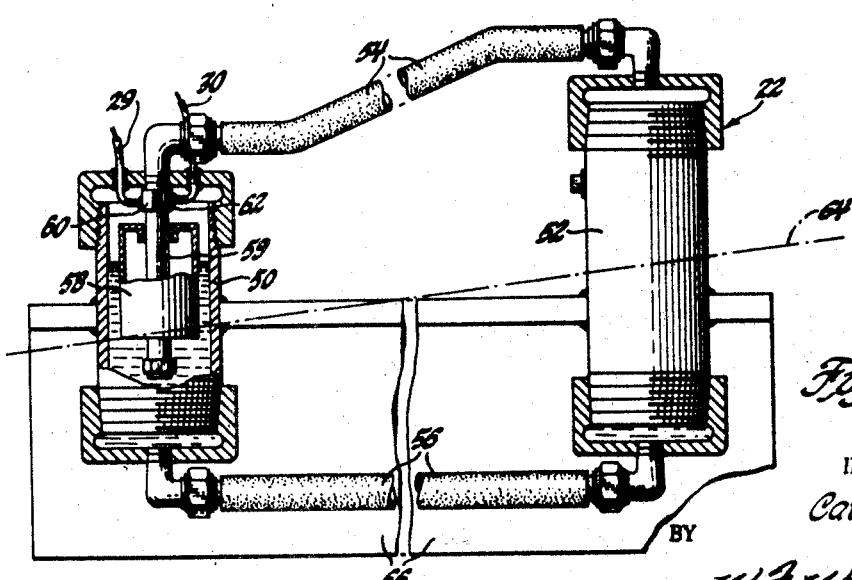
FIGURE 3 is a fragmentary enlarged view of a tilt-responsive switch of the type used in the schematic of FIGURE 2.

The tilt-responsive switch 22 used with this invention is of the float-type and, as in the case with the speed-responsive switch, may take the form of any commercially available switch which responds to inclination. As best seen in FIGURE 3, the switch 22 comprises a pair of reservoirs 50 and 52 having the upper and lower portions respectively connected by conduits 54 and 56. A liquid is disposed in the reservoir 52 and communicates through the conduit 56 with the reservoir 50 and, due to the venting effect provided by the line 54, the liquid in both reservoirs is maintained at the same horizontal level. A float 58 is provided in the reservoir 50 and is movable vertically upwardly along a rod 59 as the liquid level in reservoir 50 rises so as to connect the contacts 60 and 62 of the lines 29 and 30, respectively. As shown in FIGURE 3, where the tilt-responsive switch 22 is inclined so that its longitudinal axis is dipped downwardly, as indicated by the dot-dash line 64, the liquid level in the latter-mentioned reservoir rises and accordingly the float 58 moves upwardly to close the contacts.

As should be apparent, reservoir 52 may be adjustably supported by a support bracket 66 in order to raise or lower the reservoir relative to reservoir 50 and thereby vary the switch inclination at which the contacts close. As illustrated, however, both reservoirs 50 and 52 are rigidly fixed to the support bracket which in turn provides a means for mounting the tilt-responsive switch to the vehicle. As seen in FIGURE 1, the reservoirs lie in a plane parallel to the longitudinal axis of the vehicle so that switch 22 responds to a downward dipping of the vehicle.

The operation of the present invention should be apparent from the above description and it can be readily seen that assuming the speed-sensitive switch is set for 45 m.p.h and the tilt-responsive switch for a downward inclination of 20°, when both these conditions are met, the coil 32 of relay 26 is energized so as to close switch 40 and simultaneously energize solenoid 42 to open the valve 20. At this time, as referred to hereinbefore, the opening of valve 20 provides communication between the air reservoir 16 and the brake chamber 12 via the air line 14 and thereby automatically brakes the drive wheels 6 to retard forward movement of the vehicle. It is emphasized that both the speed and inclination conditions must be met prior to the solenoid circuit being energized. Thus assuming the vehicle is exceeding the preset 45 m.p.h., however, the inclination is less than 20°, the vehicle will not be braked. Conversely, where the inclination is more than 20°, however, the speed is less than 45 m.p.h, in this instance also, the vehicle will not be braked.

Moreover, it should be understood that the valve 20 will ordinarily employ some form of orifice which will prevent full application of the wheel brakes. In other words, sufficient air will be admitted to the brake chamber 12 to provide adequate braking for purposes of retarding the forward travel of the vehicle; however, the pressure of the air will be less than required for full braking.

Additionally, it should be understood that although this invention is shown combined with the wheel brakes directly, it can be employed with other forms of vehicle braking systems. For example, it is becoming customary to equip many heavy duty vehicles with automatic transmissions which incorporate a hydraulic braking device that provides for the braking of the drive output shaft so as to limit the wear on the vehicle brakes. This type of braking device is normally actuated by a hand lever located adjacent the driver and it should be apparent that this invention could readily be utilized for activating this lever by an air motor which would receive pressurized fluid as explained above.

Various changes and modifications can be made in the above-described control system without departing from the spirit of the invention. Such changes and modifications are contemplated by the inventor and, therefore, it should be understood that he does not desire to be limited except by the scope of the appended claims.

What is claimed is:

1. The combination with a vehicle having a fluid operated braking system, a source of pressurized fluid for the brake system, an electric control circuit having a power source, speed-responsive switch and a tilt-responsive switch located in said circuit and connected to said power source, a normally closed valve in said brake system for controlling emergency supply of fluid from the source to said brake system, a solenoid mechanically connected to the valve and electrically connected to the switches, said speed-responsive and tilt-responsive switches adapted to electrically connect the power source to the solenoid to energize the latter and open the valve to brake the vehicle when the vehicle attains a predetermined forward speed at a predetermined inclination.

2. The combination with a vehicle having a fluid-operated braking system, a source of pressurized fluid for said brake system, an electric control circuit having a power source and including a speed-responsive switch and a tilt-responsive switch connected in series, a normally closed valve in the braking system for controlling emergency supply of fluid from the source to said brake system, a solenoid operatively connected to the valve and electrically connected in said circuit, said switches adapted to connect the power source to said solenoid to open said valve and supply fluid to said brake system for automatically braking the vehicle when the latter attains a predetermined forward speed at a predetermined downward inclination.

3. The combination with a vehicle having a fluid-operated braking system, a source of pressurized fluid for the brake system, an electric control circuit having a power source, speed-responsive switch, a tilt-responsive switch, said switches located in said circuit and being electrically connected to said power source, a relay in said circuit, a normally closed valve in said brake system for controlling emergency supply of fluid from the pressurized fluid source to said brake system, a solenoid mechanically connected to the valve and electrically connected with the relay and power source, said speed-responsive and tilt-responsive switches adapted to energize the relay which in turn energizes the solenoid to open the valve and brake the vehicle when the vehicle attains a predetermined forward speed at a predetermined inclination.

4. The combination with a vehicle having a fluid-operated braking system, a source of pressurized fluid for the brake system, an electric control circuit having a power source, a normally open speed-responsive switch, a normally open tilt-responsive switch, said switches located in said circuit and being connected in series to said power source, a relay in said circuit and adapted to be energized when each of said switches are closed, a normally closed valve in said brake system for controlling emergency supply of fluid from the pressurized fluid source to said brake system, a solenoid operatively connected to the valve and electrically connected with the relay and power source, said speed-responsive and tilt-responsive switches adapted to be closed when the vehicle attains a predetermined forward speed at a predetermined downward inclination of the vehicle so as to energize the relay which in turn connects the power source to the solenoid to energize the latter and open the valve to automatically brake the vehicle.

5. The combination with a vehicle having a fluid-operated braking system, a source of compressed air, a control circuit including first means responsive to the forward speed of the vehicle, second means responsive to the inclination of the vehicle, a valve in said braking system for controlling activation of the latter, said first and second means operatively associated with said valve to move the latter when the vehicle attains a predetermined forward speed at a predetermined inclination so as to activate said braking system and retard forward travel of the vehicle.

No references cited.